US012723536B2

(12) United States Patent
Kumashiro

(10) Patent No.: US 12,723,536 B2
(45) Date of Patent: Sep. 1, 2026

(54) HEATER MEMBER FOR THERMOSTAT AND MANUFACTURING METHOD THEREFOR

(71) Applicant: NIPPON THERMOSTAT CO., LTD., Kiyose (JP)

(72) Inventor: Tsuyoshi Kumashiro, Kiyose (JP)

(73) Assignee: NIPPON THERMOSTAT CO., LTD., Kiyose (JP)

( * ) Notice: Subject to any disclaimer, the term of this patent is extended or adjusted under 35 U.S.C. 154(b) by 750 days.

(21) Appl. No.: 18/025,285

(22) PCT Filed: Sep. 24, 2021

(86) PCT No.: PCT/JP2021/034926
§ 371 (c)(1),
(2) Date: Mar. 8, 2023

(87) PCT Pub. No.: WO2022/080112
PCT Pub. Date: Apr. 21, 2022

(65) Prior Publication Data

US 2024/0026810 A1 Jan. 25, 2024

(30) Foreign Application Priority Data

Oct. 16, 2020 (JP) ................................ 2020-174770

(51) Int. Cl.
*F16K 31/02* (2006.01)
*F01P 7/16* (2006.01)

(52) U.S. Cl.
CPC .............. *F01P 7/16* (2013.01); *F16K 31/025* (2013.01); *F01P 2050/22* (2013.01)

(58) Field of Classification Search
CPC ...... F01P 7/16; F01P 2050/22; F01P 2070/04; F01P 7/167; F16K 31/025; F16K 31/002;
(Continued)

(56) References Cited

U.S. PATENT DOCUMENTS 3,839,623 A * 10/1974 Portmann ................ H05B 3/06 219/544
5,994,805 A 11/1999 Iwamoto et al.
(Continued)

FOREIGN PATENT DOCUMENTS

DE 20321257 U1 * 8/2006 .............. H05B 3/46
FR 2989551 A1 10/2013
(Continued)

OTHER PUBLICATIONS

Extended European Search Report for European Application No. 21879853.6 dated Nov. 21, 2024; 8 pp.
(Continued)

*Primary Examiner* — Tiffany T Tran
(74) *Attorney, Agent, or Firm* — HAUPTMAN HAM, LLP

(57) ABSTRACT

Provided are a heater member for a thermostat and a manufacturing method therefor which enables the formation of a short lead wire and insert-molding of a connector together with a heater while preventing the heater from being damaged during manufacturing. The heater member includes a bar-like heater arranged in a piston provided for a thermostat device; a lead wire pulled out from the heater; a terminal pin connected to one end of the lead wire; and a connector portion having a back end surface of the heater, the lead wire, and the terminal pin arranged inside thereof. The back end surface of the heater is arranged in a hollow portion formed in the connector portion without being in contact with resin forming the connector portion.

4 Claims, 7 Drawing Sheets

(58) Field of Classification Search
CPC ............ F16K 31/001; H05B 2203/016; H05B 2203/021; H05B 3/06; H05B 3/46
See application file for complete search history.

(56) References Cited

U.S. PATENT DOCUMENTS

| | | | | |
|---|---|---|---|---|
| 2011/0095091 | A1 | 4/2011 | Suda et al. | |
| 2013/0263799 | A1 | 10/2013 | Lee et al. | |
| 2017/0268407 | A1* | 9/2017 | Park | H05B 3/48 |
| 2019/0032540 | A1* | 1/2019 | Kumashiro | H05B 3/141 |

FOREIGN PATENT DOCUMENTS

| | | | |
|---|---|---|---|
| JP | 2000-092791 | A | 3/2000 |
| JP | 2002-340846 | A | 11/2002 |
| JP | 2005155831 | A | 6/2005 |
| JP | 2013-217632 | A | 10/2013 |
| JP | 2017-133664 | A | 8/2017 |
| JP | 2020-004531 | A | 1/2020 |
| WO | 2010/004606 | A1 | 1/2010 |

OTHER PUBLICATIONS

PCT/ISA/210, "International Search Report for PCT International Application No. PCT/JP2021/034926," Dec. 21, 2021.

* cited by examiner

HEATER MEMBER FOR THERMOSTAT AND MANUFACTURING METHOD THEREFOR

RELATED APPLICATIONS

The present application is National Phase of International Application No. PCT/JP2021/034926 filed Sep. 24, 2021, and claims priority from Japanese Application No. 2020-174770, filed Oct. 16, 2020, the disclosure of which is hereby incorporated by reference herein in its entirety.

TECHNICAL FIELD

This invention relates to heater members for a thermostat and manufacturing methods of the same, specifically to a heater member for a thermostat and a manufacturing method thereof where a connector can be insert-mold together with a heater while preventing the heater from being damaged at the time of manufacturing.

BACKGROUND ART

A thermostat device, which is disposed in a coolant system of engines for vehicles, for example, and controls the coolant temperature variably, incorporates wax (a thermal expansion member) which expands or contracts due to the sensed temperature change of coolant flowing through the circulation passages. The thermostat device functions to keep the coolant at a predetermined temperature by opening or closing a valve body by volume changes in response to the expansion or contraction of wax.

In some thermostat devices of this type, a heating means is provided for controlling the temperature of the thermal expansion member encapsulated in a case and configured to be capable of controlling the volume change thereof by the heat generated by the heating means.

A conventional electronically-controlled thermostat device has a heater inserted and disposed inside a piston of a thermoelement, and has a structure where the valve is opened and closed by the activation of the thermoelement caused by heating the thermal expansion member in the thermoelement with the heater.

In such a conventional electronically-controlled thermostat device, leading portions of lead wires from the heater are molded with resin after the leading portions are connected by soldering to connector terminals in a connector made of resin assembled from the outside of the device housing.

Unfortunately, the conventional structure is problematic in that there might be a risk of short-circuiting due to the twisting of leads from the heater because the casing of the connector made of resin is not fixed in the rotational direction against the device housing and further risk of damaging the heater by the molding pressure if the resin material contacts the rear end face of the heater at the time of molding with the resin material.

For such a problem, Patent literature PLT 1 discloses a configuration of a heater member which includes a pair of insulating rod pieces 80 configured to hold a heater 70 at a tip end portion as shown in FIG. 7 and to clamp the pair of lead wires 71, 72 drawn from the heater 70 while maintaining the lead wires in an insulated state and a connector 81 assembled to the opposite side of heater holding portions of the insulating rod pieces 80 and also assembled and fixed to the outside of the device housing.

The connector portion 81 has a pair of lead end connection pieces 85*a*, and 86*a*, to which each lead wire 71, and 72 is connected, at the connector terminals 85, and 86 provided at the inner end, and is provided with an engagement concave portion 88 to be engaged with a twist prevention engagement convex portion 87 which is provided on the opposite side portion to the heater holding portion of the insulating rod pieces 80.

With such a heater member, since the heater 70 and the pair of leads 71, 72 are held by a pair of insulated rod pieces 80 and a piston 60 having a bottomed cylindrical shape is provided to cover the outside thereof, the risks of cracking of the ceramic heater, and cutting and bending (twisting) of the leads can be reduced.

In the configuration disclosed in PTL 1, however, the entire length of the heater member becomes long because of long leads 71 and 72, which does not allow for the contribution of downsizing of the thermostat device.

CITATION LIST

Patent Literature

PLT 1: JP-2017-133664A

SUMMARY OF INVENTION

Technical Problem

A possible solution to the lead length and twisting problem is to join the terminals directly to the heater without using lead wires. In this case, for example, a connector may be prepared by insert-molding of the connector terminals, and the terminals of the ceramic heater may be laser-bonded to the connector terminals.

However, it is problematic that this configuration makes the management of the laser bonding process difficult, and the workmanship of the bonded section is not favorable. In addition, spatter burrs may come into contact with the piston during the bonding process, in which case the insulation resistance may deteriorate and the yield may decrease.

The present invention is developed in view of the above-mentioned points, and the purpose of this invention is to provide a heater member for a thermostat and a manufacturing method for the heater member, capable of forming the length of the lead wires short and insert-molding a connector together with the heater, while preventing damage to the heater during manufacturing.

Solution to Problem

A heater member for a thermostat according to the present invention is a heater member to be provided in the thermostat device, which includes

- a bar-like heater disposed in a piston that is provided in the thermostat device,
- lead wires being drawn out from the heater,
- a terminal pin to which an end of the lead wire is connected, and
- a connector portion in which the rear end face of the heater, the lead wire, and the terminal pin are provided, wherein the rear end face of the heater is disposed in a hollow portion formed in the connector portion and is not in contact with the resin material forming the connector portion.

It is desirable that the circumferential surface of the heater is covered with the resin material and a heater protective portion integrally formed with the connector portion is provided.

The lead wire is joined with the terminal pin to be electrically connected; for example, they are preferably connected by crimping.

In the case of the heater member for a thermostat configured in this manner, when insert-molding of the heater and the connector portion the rear end face of the heater is disposed in a hollow portion formed in the connector portion and is not in contact with the resin material; resultantly, the heater is protected from molding pressure of the resin material (injection pressure, pressure by the mold) and prevented from damage occurring. Further, covering the circumferential surface of the heater with the heater protective portion allows for improving the heat retention performance. Further, the length of the lead wire can be shortened, which allows for reducing the overall length of the heater member and for contributing to the downsizing of thermostat products. Further, the terminal pins, lead wires, connector, and heater can be insert-molded, allowing the manufacturing time to be shortened and the cost to be reduced. Further, the variation in molding dimension is reduced, thereby improving yields. Further, the lead wires are disposed in the connector portion, thereby preventing the lead wires from twisting.

Further, when the lead wires are connected to the terminal pins by crimping, this reduces the equipment costs compared to the laser bonding case and also avoids the problem of spattering burrs generated during laser bonding.

A method for manufacturing the heater member for a thermostat according to the present invention is a method for manufacturing the heater member to be provided in the thermostat device, which includes a step of connecting the lead wires drawn from the bar-like heater disposed in the piston to terminal pins, a step of insert-molding the connector to dispose the terminal pins and the rear end face of the heater connected via lead wires therein, wherein in the step of insert molding, using a mold for forming an opening and an internal space communicating therewith in the connector, the rear end face of the heater is disposed in the opening-formed portion. In the step of insert molding, it is desirable to cover the circumferential surface of the heater with the resin material and to form the heater protective portion integrally with the connector.

Since the rear end face of the heater is disposed in a hollow portion at the time of insert molding of the heater and the connector portion and is not in contact with the resin material, this method allows the heater to be protected from molding pressure of the resin material (injection pressure, pressure by the mold) and prevented from damage occurring. Further, covering the circumferential surface of the heater with the heater protective portion allows for improving the heat retention performance. Further, the length of the lead wire can be shortened, which allows for reducing the overall length of the heater member and for contributing to the downsizing of thermostat products. Further, the terminal pins, lead wires, connector, and heater can be insert-molded, allowing the manufacturing time to be shortened and the cost to be reduced. Further, the variation in molding dimension is reduced, thereby improving yields. Further, the lead wires are disposed in the connector portion, thereby preventing the lead wires from twisting.

Further, when the lead wires are connected to the terminal pins by crimping, this reduces the equipment costs compared to the laser bonding case and also avoids the problem of spattering burrs generated during laser bonding.

Advantageous Effects of Invention

According to the present invention, a heater member for a thermostat and a manufacturing method for the heater member, capable of forming the length of the lead wires short and insert-molding a connector together with the heater, while preventing damage to the heater during manufacturing can be provided.

DESCRIPTION OF EMBODIMENTS

First Embodiment

Figure 1:
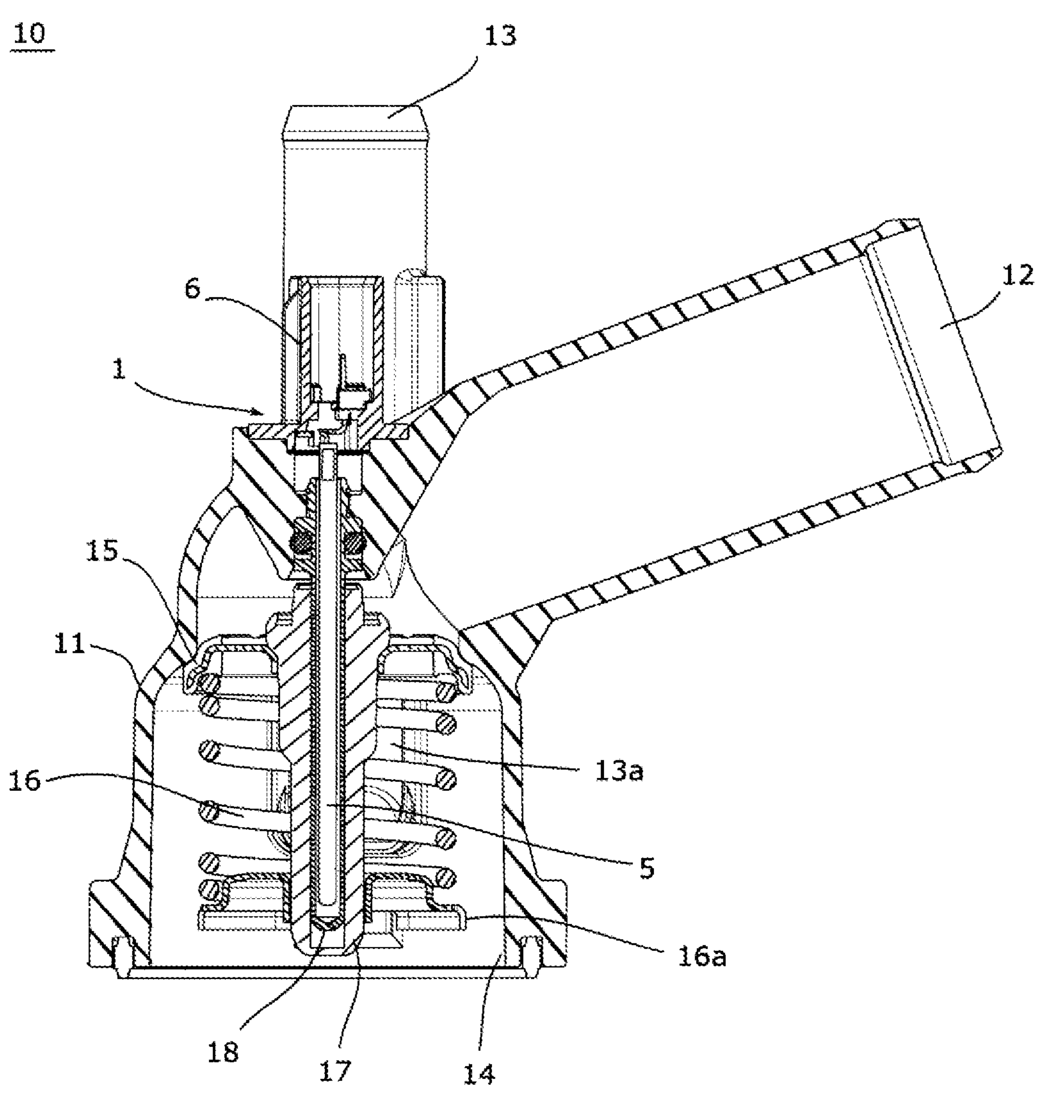
FIG. 1 is a cross-sectional view of a thermostat device on which a heater member for a thermostat (a first Embodiments) according to the present invention is mounted.

A first embodiment of a heater member for a thermostat according to the present invention will be described based on the drawings below. FIG. 1 is a cross-sectional view of a thermostat device equipped with the heater member for a thermostat of the present invention.

An electrically-controlled thermostat device 10 shown in FIG. 1, installed in an engine cooling system, for example, is equipped at a crossing portion of a coolant passage from a radiator and a coolant passage from an outlet of the engine, and the temperature of the coolant toward an inlet of the engine is controlled by selectively switching the flow of the coolant in the first and second fluid passages composed of above coolant passages.

The thermostat device 10 is provided with a piston 18 having a bottomed cylindrical shape mounted hanging in a device housing 11 and a thermoelement 17 that is fittingly provided freely slidable along the axial direction in the outside thereof. At the upper-level portion in the axial direction of the thermoelement 17, a main valve body 15 is provided that opens and closes the fluid passage formed in the device housing 11.

In the thermoelement 17, a thermal expansion member such as wax is filled, and the tip end of the piston 18 is placed in the thermal expansion member; the temperature of the thermal expansion member is configured to be controllable by the heater 5 provided in the piston 18.

In the electrically-controlled thermostat device 10, a spring 16 urging the main valve body 15 and a spring seat 16*a* are provided, and also a second valve body that is to be a bypass valve and a bypass spring are provided. However, the structure thereof is well-known and specific drawings and descriptions will be omitted here.

In the drawings, reference sign 12 denotes the inlet of coolant from the radiator, reference sign 13 denotes the inlet from the bypass passage, reference sign 13*a* denotes an inlet to the downstream of the main valve body 15 from the inlet of the bypass passage, and reference sign 14 denotes an opening for the passage leading to the inlet of the engine. Further, reference sign 6 denotes a connector portion provided in the piston 18 which connects the heater 5 to the outside.

The heater member according to the present invention is a member including the heater 5 and the connector portion 6 and is denoted by reference sign 1 below.

Figure 2:
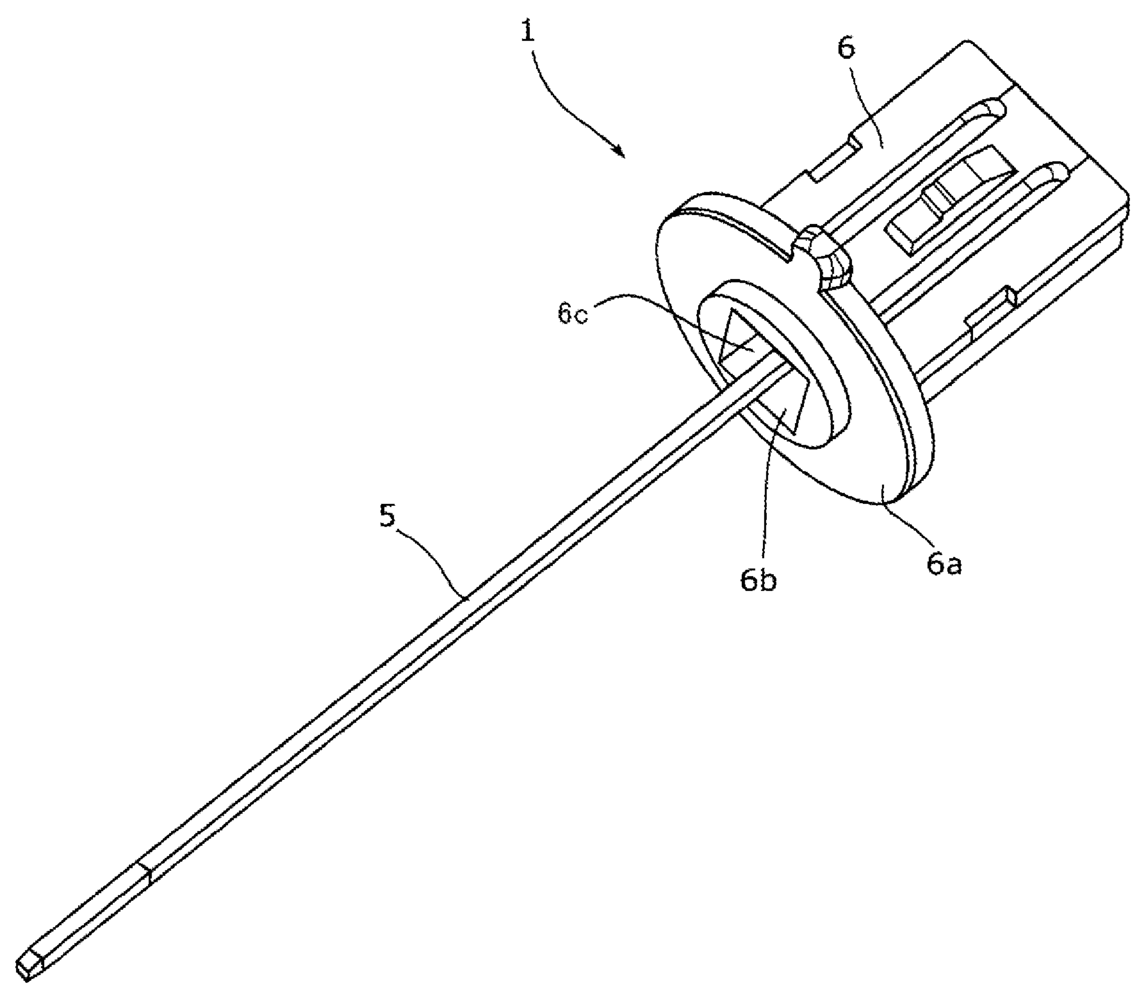
FIG. 2 is a perspective view of a heater member 1.
Figure 3A:
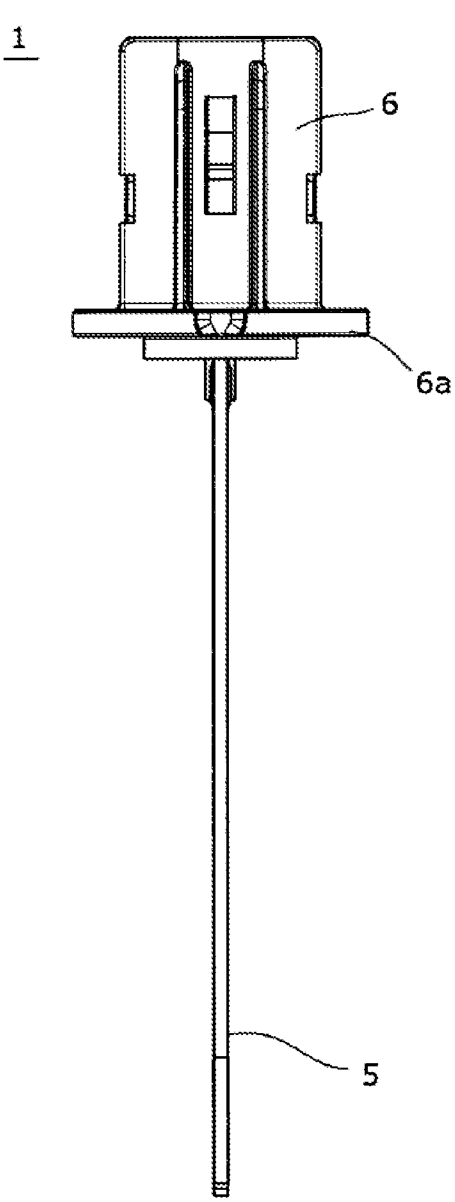
FIG. 3(*a*) is a front view of the heater member, and FIG. 3(*b*) is a side view (partially a cross-sectional view) of the heater member.
Figure 3B:
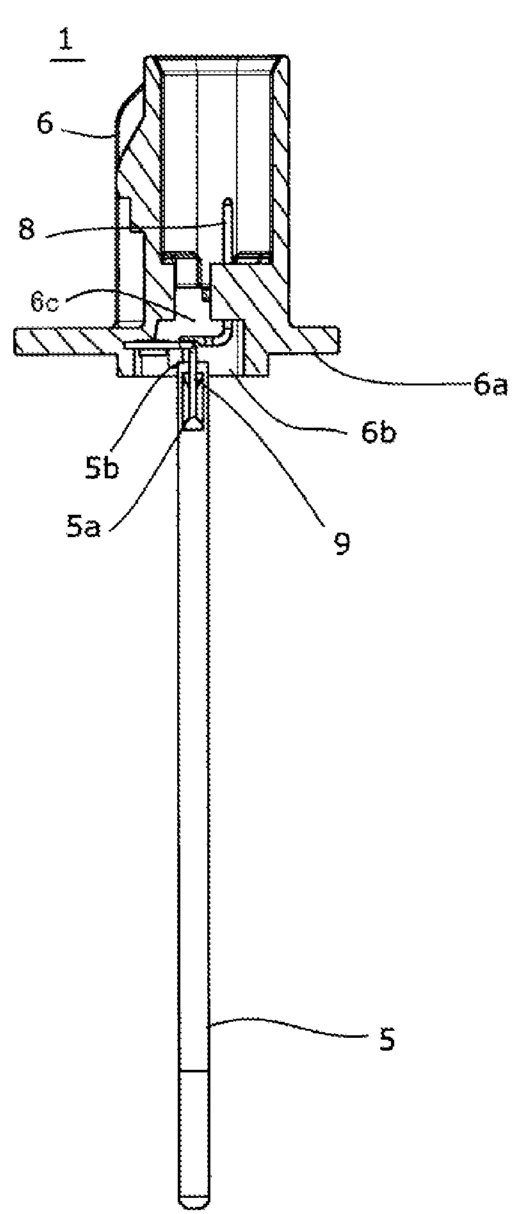

FIG. 2 is a perspective view of the heater member 1, FIG. 3(*a*) is a front view of the heater member 1, and FIG. 3(*b*) is a side view (partially a cross-sectional view) of the heater member 1.

The heater member 1 is provided with the flat bar-like heater 5 made of ceramics and the resin-mold connector portion 6.

As shown in FIG. 3(*b*), in the connector portion 6, a pair of terminal pins 8 are placed fixedly. The terminal pins 8 are electrically connected to the terminal portions 5*a* of the heater 5 through the lead wires 9.

Figure 4A:
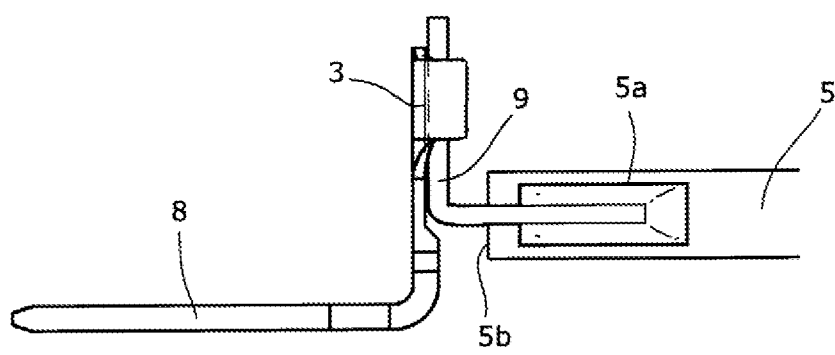
FIG. 4(*a*) and FIG. 4(*b*) are side-views that illustrate the configuration of the connection of the terminal pin 8 and the terminal portion 5*a* of the heater 5.
Figure 4B:
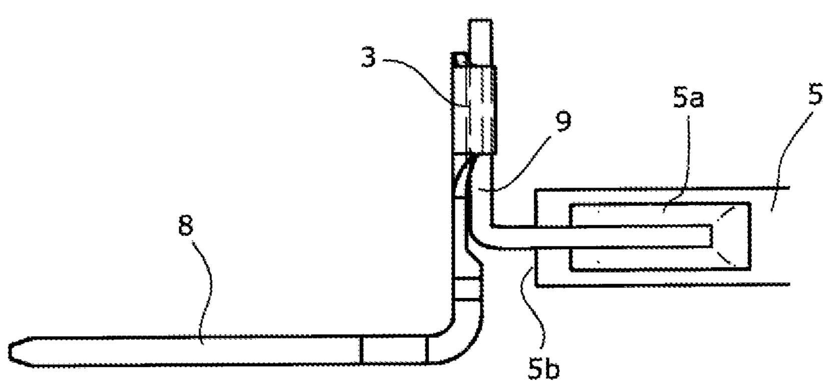

FIG. 4(*a*) and FIG. 4(*b*) are side-views that illustrate the configuration of the connection of the terminal pin 8 and the terminal portion 5*a* of the heater 5.

As shown in FIG. 4(*a*), a crimping portion 3 is provided at the rear end portion of the terminal pin 8, and the end portion of the lead wire 9 drawn from the terminal portion 5*a* is placed. Further, the end portions of the lead wire 9 are crimped at the crimping portion 3, as shown in FIG. 4(*b*), and the lead wire 9 is electrically connected to the terminal pin 8.

A rear end face 5*b* of the heater 5 is located in the connector portion 6, but the rear end face 5*b* is placed in the hollow 6*c* in the connector portion 6 so that the rear end face 5*b* does not come into contact with the resin material forming the connector portion 6. As shown in the perspective view of FIG. 2, an opening 6*b*, communicating with the hollow portion 6*c* in the connector portion 6, is formed at an approximately central area of a flange 6*a*, from which the heater 5 is extending out, and has a diameter size not to be in contact with the heater 5. Namely, the rear end face 5*b* of the heater 5 is disposed in the hollow portion 6*c* in the connector portion 6 without being in contact with the resin material.

This structure allows preventing the rear end face 5*b* of heater 5 from coming into contact with the molding the resin material when insert-molding of the connector portion 6 and heater 5 from damaging due to the molding pressure.

To manufacture such a heater member 1, first, terminal pins 8 and the lead wires 9 drawn out from the heater 5 are connected by crimping, as shown in FIGS. 4(*a*) and 4(*b*).

Then, to form the connector portion with the resin material, the heater 5 and the terminal pins 8, which are connected via the lead wires 9, are placed in a mold not shown in the drawing and molded by insert-molding. At this time, since the mold is formed such that the opening 6*b* and the hollow portion 6*c* communicating therewith in the connector portion 6 are formed, and the rear end face 5*b* of the heater 5 is placed at the place where the opening 6*b* is to be formed, the rear end face 5*b* of the heater 5 does not come into contact with the resin material and effects of molding pressure of the forming resin material to the heater 5 are avoided.

With thus configured heater member 1 for a thermostat, since, when insert-molding of the heater 5 and the connector portion 6, the rear end face 5*b* of the heater 5 is disposed in a hollow portion 6*c* and is not in contact with the resin material, the heater 5 is protected from molding pressure of the resin material (injection pressure, pressure by the mold) and prevented from damage occurring.

Further, the length of the lead wire 9 can be shortened, which allows for reducing the overall length of the heater member 1 and for contributing to the downsizing of products. Further, the terminal pins 8, lead wires 9, connector portion 6, and heater 5 can be insert-molded, allowing the manufacturing time to be shortened and the cost to be reduced. Further, the variation in molding dimension is reduced, thereby improving yields. Further, the lead wires 9 are disposed in the connector portion 6, thereby preventing the lead wires 9 from twisting.

Further, when the lead wires are connected to the terminal pins by crimping, this reduces the equipment costs compared to the laser bonding case and also avoids the problem of spattering burrs generated during laser bonding.

In the above Embodiment, the terminal pins 8 and the lead wires 9 are joined by crimping. The present invention is not limited by the Embodiment, and the junction of the terminal pins 8 and the lead wires 9 may be carried out by laser bonding or soldering.

Second Embodiment

A second embodiment of a heater member for thermostats according to the present invention will be described based on the drawings below.

Figure 5:
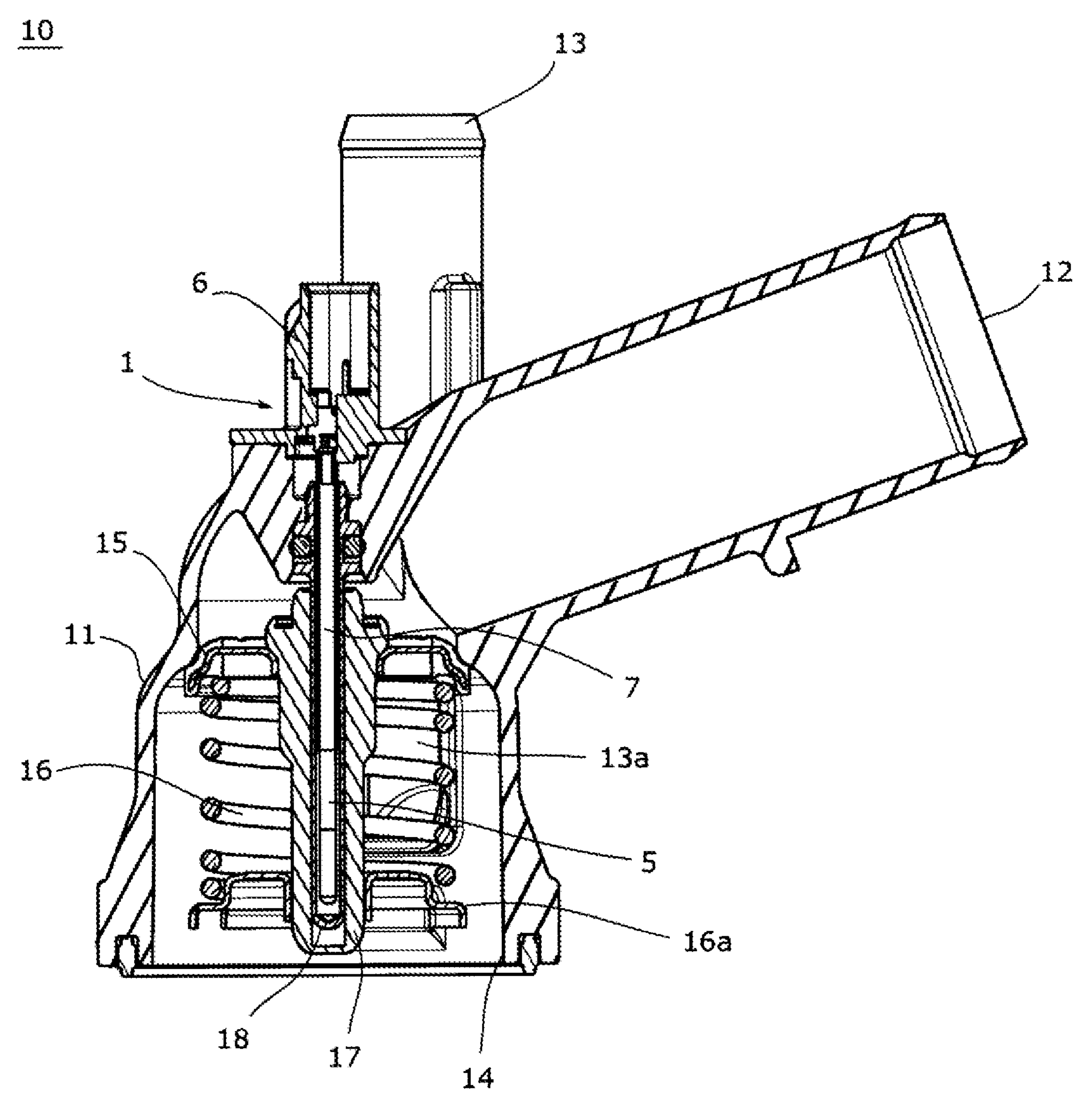
FIG. 5 is a cross-sectional view of the thermostat device on which the heater member for a thermostat (a second Embodiment) according to the present invention is mounted.
Figure 6A:
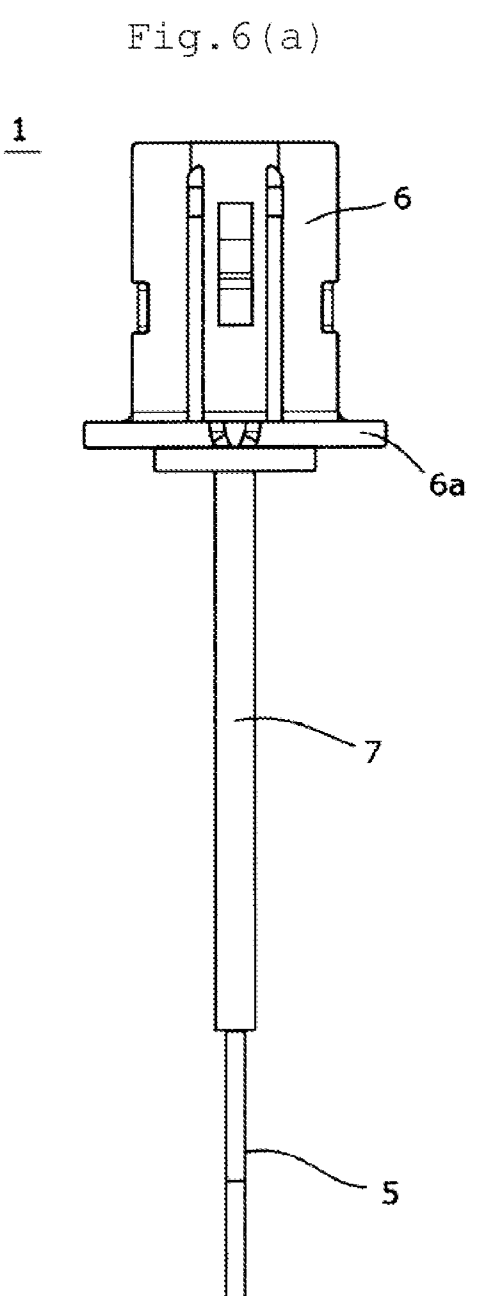
FIG. 6(*a*) is a front view of the heater member 1, and FIG. 6(*b*) is a side view (partially a cross-sectional view) of the heater member 1.
Figure 6B:
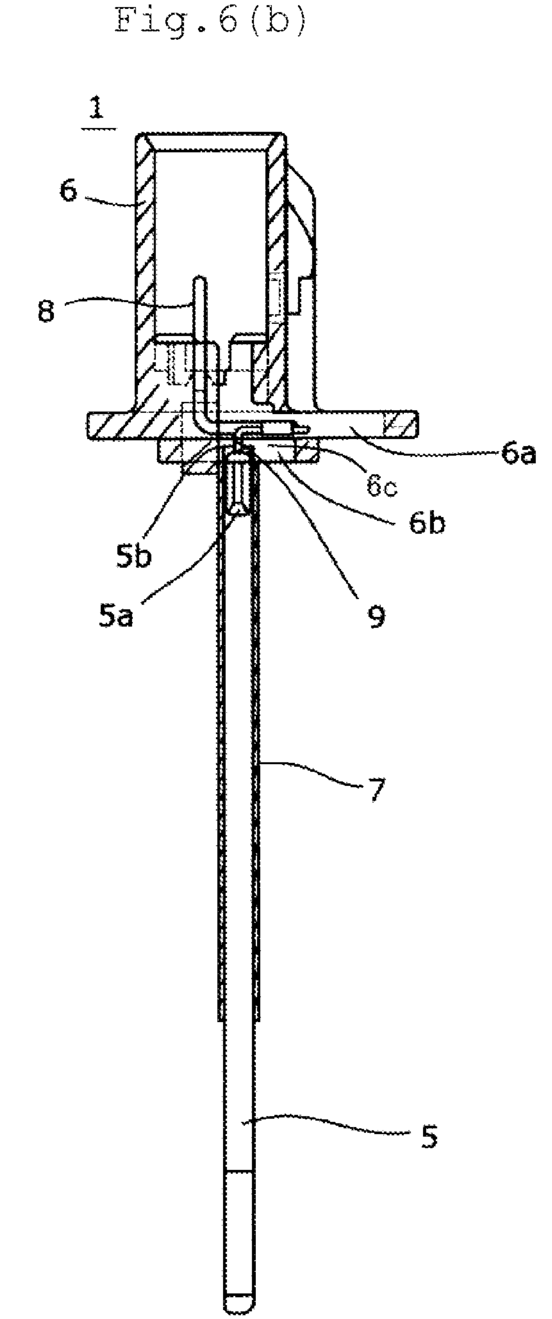
Figure 7:
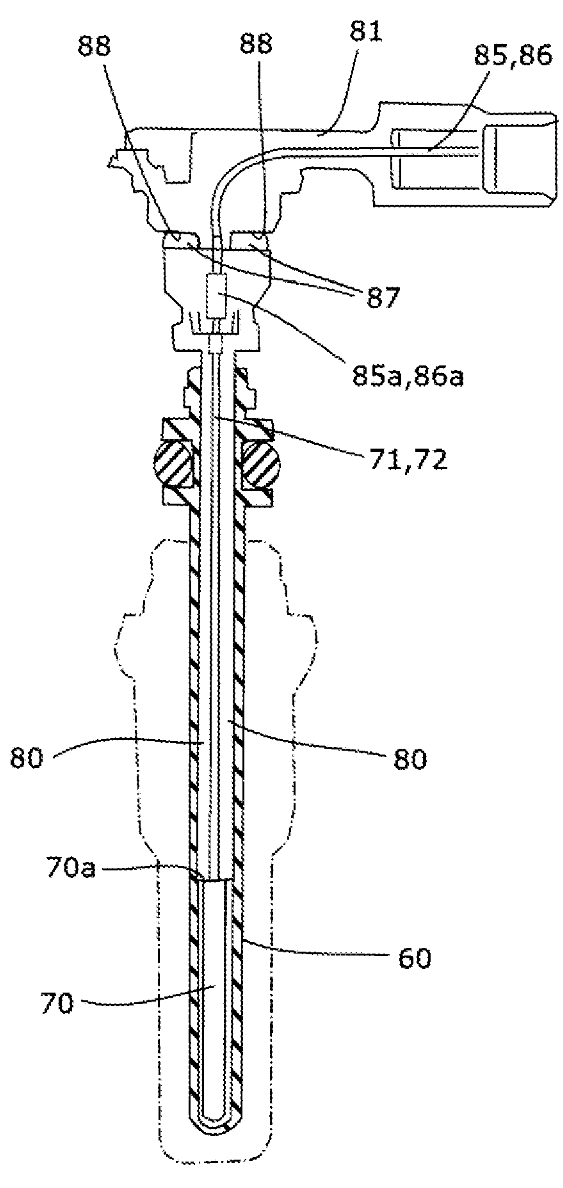
FIG. 7 is a cross-sectional view of a conventional heater member.

FIG. 5 is a cross-sectional view of a thermostat device equipped with the heater member (a second Embodiment) for thermostats of the present invention. FIG. 6(*a*) is a front view of the heater member 1, and FIG. 6(*b*) is a side view (partially a cross-sectional view) of the heater member 1. It is noted that the same members as those in the first embodiment above are denoted with the same referential signs and the detailed description will be omitted.

In the second embodiment, as shown in FIGS. 5 and 6(*a*), (*b*), the heater protective portion 7 is provided to cover the circumferential surface of the heater 5 from the middle of the long heater 5 to the rear end side (connector portion 6 side), which is different from the first embodiment described above.

The heater protective portion 7 is integrally formed with the connector portion 6. That is, the heater protective portion 7 is formed with a resin material to cover the circumferential surface of heater 5 in insert-molding of the connector portion 6. Since the impact due to injection pressure is received by the mold during the formation of the heater protective portion 7, the pressure is not directly applied to the heater 5 and is weakened. Further, since the holding pressure is applied from the radial direction (in the lateral direction) and received by both sides of the flat surfaces, it is canceled and weakened.

Thus, in the second embodiment of the present invention, since the circumferential surface of the heater is covered with the heater protective portion 7, the heat retention performance can be improved.

Referential Signs List

- 1 heater member for thermostats
- 5 heater
- 6 connector portion
- 6*b* opening
- 6*c* hollow portion
- 7 heater protective portion
- 8 terminal pins
- 9 lead wires

What is claimed is:

1. A heater member to be provided on a thermostat device, comprising:

a bar-like heater disposed in a piston provided in the thermostat device, a lead wire drawn out from the heater, a terminal pin to which an end of the lead wire is connected, a connector portion in which a rear end face of the heater, the lead wire, and the terminal pin are provided, and a heater protective portion, wherein the rear end face of the heater is disposed in a hollow portion formed in the connector portion and is not in contact with a resin material forming the connector portion, and the heater protective portion covers a circumferential surface of the heater with the resin material and is integrally formed with the connector portion.

2. The heater member for a thermostat recited in claim 1, wherein the lead wire and the terminal pin are joined to be electrically connected.

3. The heater member for a thermostat recited in claim 2, wherein the lead wire and the terminal pin are connected by crimping.

4. The heater member for a thermostat recited in claim 1, wherein the connector portion is a separate component from a device housing.

* * * * *